US011227352B2

(12) United States Patent
Zeng et al.

(10) Patent No.: US 11,227,352 B2
(45) Date of Patent: Jan. 18, 2022

(54) TEACHING METHOD SYSTEM FOR CONNECTING AND APPLYING RESEARCH NEEDS WITH A TEACHING METHOD

(71) Applicants: Tingying Zeng, Brighton, MA (US); Kevin Zeng Qi, Brighton, MA (US)

(72) Inventors: Tingying Zeng, Brighton, MA (US); Kevin Zeng Qi, Brighton, MA (US)

( * ) Notice: Subject to any disclaimer, the term of this patent is extended or adjusted under 35 U.S.C. 154(b) by 0 days.

(21) Appl. No.: 17/029,179

(22) Filed: Sep. 23, 2020

(65) Prior Publication Data

US 2021/0004925 A1 Jan. 7, 2021

Related U.S. Application Data

(63) Continuation of application No. PCT/US2019/023855, filed on Mar. 25, 2019.

(60) Provisional application No. 62/647,213, filed on Mar. 23, 2018.

(51) Int. Cl.
*G06Q 50/20* (2012.01)
*G06Q 10/06* (2012.01)

(52) U.S. Cl.
CPC ..... *G06Q 50/20* (2013.01); *G06Q 10/063118* (2013.01); *G06Q 50/2053* (2013.01)

(58) Field of Classification Search
None
See application file for complete search history.

(56) References Cited

U.S. PATENT DOCUMENTS

| | | | |
|---|---|---|---|
| 10,311,442 B1* | 6/2019 | Lancaster | G06Q 30/00 |
| 2006/0106657 A1* | 5/2006 | Pollak | G06Q 10/10 705/7.13 |
| 2009/0202971 A1* | 8/2009 | Cortez | G06Q 50/20 434/350 |
| 2010/0198813 A1* | 8/2010 | Chi | G06F 16/951 707/722 |
| 2010/0312595 A1 | 12/2010 | Lynn | |
| 2011/0070572 A1* | 3/2011 | Miller | G09B 7/02 434/322 |
| 2011/0256521 A1* | 10/2011 | Mansfield | G09B 7/00 434/350 |
| 2012/0023218 A1* | 1/2012 | Journeau | G06Q 50/20 709/223 |

(Continued)

*Primary Examiner* — Sujay Koneru
(74) *Attorney, Agent, or Firm* — Lambert Shortell & Connaughton; David J. Connaughton, Jr.; Justin P. Tinger

(57) ABSTRACT

This invention innovates an integrated instructional educational methodology called $(A'')_x$-to-One training model to students both in science, technology, engineering and mathematics ("STEM") or other fields of education and in leadership development into one professional integrated training program. The system has testimonial feedbacks for effective and positive results when providing training for a wide range of students from children to adults. Examples of the present educational model can be particularly useful for high school students, undergraduate students who are learning STEM, and in interaction with formal working employees through the system's integration of many kinds of events and social activities. The system uses formation of an advisor team and labs to enhance leadership training as well as a follow up service which provides support to students.

9 Claims, 3 Drawing Sheets

(56) References Cited

U.S. PATENT DOCUMENTS

| | | | | |
|---|---|---|---|---|
| 2012/0129145 | A1* | 5/2012 | Miller | G09B 19/00 |
| | | | | 434/365 |
| 2012/0179618 | A1* | 7/2012 | Brown | G06Q 50/2053 |
| | | | | 705/327 |
| 2012/0288843 | A1* | 11/2012 | Shaffer | G06Q 50/20 |
| | | | | 434/350 |
| 2013/0137078 | A1* | 5/2013 | Shustorovich | G09B 7/00 |
| | | | | 434/362 |
| 2014/0131988 | A1* | 5/2014 | Glosh | B42D 15/00 |
| | | | | 283/67 |
| 2014/0188574 | A1* | 7/2014 | Luca | G06Q 10/06393 |
| | | | | 705/7.39 |
| 2014/0337093 | A1* | 11/2014 | Jain | H04L 67/306 |
| | | | | 705/7.29 |
| 2014/0343996 | A1* | 11/2014 | Kapoor | G06Q 10/1097 |
| | | | | 705/7.21 |
| 2015/0074042 | A1* | 3/2015 | Teytelman | G06F 16/93 |
| | | | | 707/608 |
| 2015/0310751 | A1* | 10/2015 | Tolia | G09B 5/06 |
| | | | | 434/309 |
| 2015/0325141 | A1* | 11/2015 | Saunders | G09B 5/06 |
| | | | | 434/107 |
| 2016/0196395 | A1* | 7/2016 | Green | G16H 40/20 |
| | | | | 705/2 |
| 2017/0091686 | A1* | 3/2017 | Goyal | G06Q 10/101 |
| 2018/0330296 | A1* | 11/2018 | Park | G06F 16/00 |
| 2020/0226518 | A1* | 7/2020 | Li | G06Q 10/063118 |

* cited by examiner

TEACHING METHOD SYSTEM FOR CONNECTING AND APPLYING RESEARCH NEEDS WITH A TEACHING METHOD

FIELD OF THE INVENTION

The present invention is related to an innovative method and system created to effectively train students through STEM education. The system and method may be applied at primary and secondary school levels, college, and graduate school, as well as field learning, leadership training, or other career development training for adults and children. In a particular embodiment, the system is directed to training for youth in scientific innovations and in leadership service to society, thereby preparing students to innovate and lead for a better world in the future.

BACKGROUND

Today, Science, Technology, Engineering, and Mathematics ("STEM") education has attracted great attention as being important for developing critical thinking and for training students to bring about innovations to solve problems for the world. Most of the methods we are using in schools or universities or colleges are focused either for STEM training only, or for leadership training only through such as debating or community service work, but not both.

However, it has been discovered that a talented mind with big vision and wisdom for actions in scientific innovations is needed to find problems and then to explore original solutions to effectively solve problems for the world. This mind has to be integrated, cultured, and supervised. These STEM learning activities have to be incorporated into public activities in opening mind and training leadership for the students by professional advisors.

Further, there is a technical problem in the educational and research fields that more work, such as research work, is needed as academics develop hypotheses. In other words there are many hypotheses and research ideas being generated, but a shortage of those who can carry out the required research and "leg work" to test these hypotheses and perform the research.

SUMMARY OF THE INVENTION

The subject matter of this disclosure may involve, in some cases, interrelated products, alternative solutions to a particular problem, and/or a plurality of different uses of a single system or application.

The present invention forms an integrated educational model in professional trainings for youth in STEM programs and also in leadership development. It is an innovation in education. It plays a significant role for our next generations' education for innovations, as well as wisdom in career development.

The present innovative education methodology and its related computing system can be used for training of, among others, high school students, undergraduate students, masters, and most first two years Ph.D. students, as well as internship trainings for graduated students before going to practical career/job marketing, but of course is not limited to these groups. The students can be one person or a small group of people. The training will have the best educational impact if the campus or other training location is in a high academic area with high tech and leading industry companies nearby.

The present invention includes aspects of instructional education methods, as well aspects of a model for education or business in instructional education models, as well as combinations of both of these aspects.

This invention innovates an integrated instructional educational methodology called an $(A^n)_x$-to-One training model to students both in science, technology, engineering and mathematics ("STEM") or other fields of education and also provides leadership development in one professional integrated training program. The system has testimonial feedback for effective and positive results when providing training for youth aged from $7^{th}$ to $12^{th}$ grader, as well as adults including undergraduates, and graduate students during summer internships training, as well as career education for professionals. This invention also is related to the application of the $(A^n)_x$-to-One model for diverse students in world wide education as an effective model in instructional education. Examples of such $(A^n)_x$-to-One educational model can be particularly used for high school students, undergraduate students who are learning STEM while wanting to have practical working experiences in scientific lab research, and in interaction with formal working employees through many kinds of events and social activities in both universities and in concentrated working places where there are creative ideas generated every day. The training includes formation of an advisors team and labs, as well as leadership training and a follow up service provides support students and provides one of many unique aspects of this education model and system. In certain embodiments, the computerized system may be operable to automatically schedule and reserve certain lab time slots to facilitate the operation of the learning program. Further still, the system may be operable to identify potential students and/or advisors/teachers based on a stored data relating to the student and/or teacher compared to a research need. The system may automatically generate an introductory email or other electronic contact based on the stored data and may send this email or contact to the identified individuals.

Computation methods will be used by the method and particularly the computerized system to help the optimization of the designed project selections and best suitable programs for a youth or for a small group students to be trained. In particular, the computerized system may be programmed to receive an input or inputs relating to research need areas. The system may further be programmed to calculate the requirements for such research, and can then apply it to the present teaching methodology so that the students of the system may provide a meaningful research impact as a result and process of their participation in the training method. In other embodiments, after a successful training, the inputs from the researchers may be recycled as practice subject matter without contributing to the researching methods and/or hypothetical scenarios may be used. The computerized system may save all results in a computerized memory, and may be programmed to adjust the requirements (for example, increasing advisors, teachers, or students, as discussed below) based on a feedback input into the system provided by a system administrator for re-use of a particular curriculum and/or for calculations of variables for a new research need.

In one embodiment, the teaching method may utilize integer variables such as, $x=1, 2, \ldots 6$; $n=1, 2, \ldots$. That means if $n=2$, $x=6$, the trained students will be obtained a training model as $[(A^2)_1, (A^2)_2, (A^2)_3, (A^2)_4, (A^2)_5, (A^2)_6]$: this means that we will have two (n) leaders at each of six (A) different training steps. In a particular embodiment, the two leaders at the six training steps may include: two (n)

advisors to supervise the student or the small group students in STEM project ($A_1$) or in a other project based on student(s)' interest or majors or career direction; two (n) lab instructors ($A_2$) such as scientists helping in the labs to support the research projects for scientific findings and solving the problems or making the innovations, inventions, or discoveries; two (n) leaders, advisors, or consultants to work with the students or the small group students to develop leadership ($A_3$) or to train them with certain tasks for internship training; two (n) advisors to follow up to support and to teach the students for scientific article writings, preparing for science competitions, preparing for conference presentations and more ($A_4$). Further, the system will have two (n) advisors to supervise them for how to apply to colleges ($A_5$) or how to apply for top university for their graduate programs, or for their career development for a competitive job marketing or for a better service or change the world. Finally the system will have two advisors (n) to continue working with the youth or the small group students ($A_6$) who come back to take subsequent training, for example in an undergraduate student program study. This the training is done with $[(A^2)_1, (A^2)_2, (A^2)_3, (A^2)_4, (A^2)_5]$.

Ideally, an outcome of the training system is that the students will have a big vision, and will develop an eye towards the future to better serve society. The $(A")_x$-to-One model and its actions can be in the format of any of the following: $[(A^2)_1, (A^3)_2, (A^1)_3, (A^1)_4, (A^0)_0, (A^0)_0]$, or A1-to-one, or A6-to-one, or A4-to-one.

DETAILED DESCRIPTION

Figure 1:
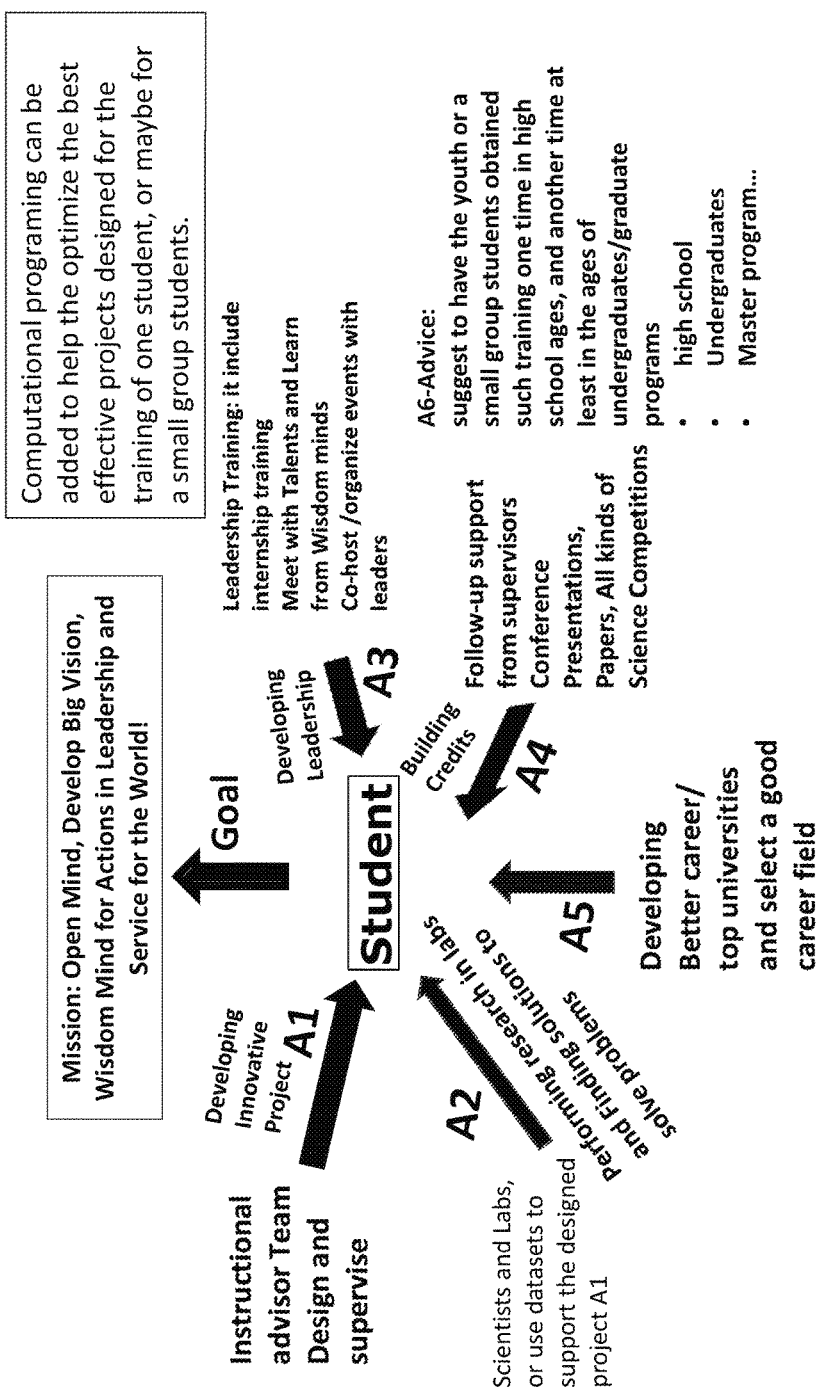
FIG. 1 provides a flow chart of an embodiment of the present teaching system.

The detailed description set forth below in connection with the appended drawings is intended as a description of presently preferred embodiments of the invention and does not represent the only forms in which the present invention may be constructed and/or utilized. The description sets forth the functions and the sequence of steps for constructing and operating the invention in connection with the illustrated embodiments.

In the description, specific details are set forth in order to provide a thorough understanding of the examples disclosed. In other instances, well-known methods, procedures, components and materials have not been described in detail as not to unnecessarily lengthen the present disclosure.

The terminology used herein is for the purpose of describing particular embodiments only and is not intended to be limiting. As used herein, the singular forms "a", "an", and "the", are intended to include the plural forms as well, unless the context clearly indicates otherwise. It should be further understood that the terms "includes" and/or "including", when used in the present specification, specify the presence of stated features, integers, steps, operations, elements, and/or components, but do not preclude the presence or addition of one or more other features, integers, steps, operations, elements, components, and/or groups thereof not explicitly stated.

Some embodiments of the present invention may be practiced on a computer system that includes, in general, one or a plurality of processors for processing information and instructions, RAM, for storing information and instructions, ROM, for storing static information and instructions, a data storage unit such as a magnetic or optical disk and disk drive for storing information and instructions, modules as software units executing on a processor, an optional user input and/or output device such as a display screen device (e.g., a monitor) for display screening information to the computer user, and an optional user input device.

As will be appreciated by those skilled in the art, the present examples may be embodied, at least in part, as a computer program product embodied in any tangible medium of expression having computer-usable program code stored therein. For example, some embodiments described below with reference to flowchart illustrations and/or block diagrams of methods, apparatus (systems) and computer program products can be implemented by computer program instructions. The computer program instructions (referred to herein as "software," "program" and/or "application") may be stored in non-transitory computer-readable media that can direct a computer or other programmable data processing apparatus to function in a particular manner, such that the instructions stored in the computer-readable media constitute an article of manufacture including instructions and processes which implement the function/act/step specified in the flowchart and/or block diagram. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

There is a technical problem in the educational and research fields that more work, such as research work, is needed as academics develop hypotheses to test and prove these, and to generate or expand on research areas. There is also a great need to provide both STEM and leadership training for students. So, the present computerized system is operable to identify potential areas of research that need more "leg work" and is operable to combine this with a teaching method to solve the problems of needing more researchers and workers in the field. The computerized system can be used to solve this problem by identifying such areas needing more research, any related data sets, and then based on analysis of the complexity and amount of data, can automatically assign A, n, and x values to optimize the projects and manpower to be used for the training.

The computerized system may be programmed to automatically identify potential areas needing further study, which can be the subject of the student research. In one embodiment, this may include the system using keyword searching and natural language searching algorithms to identify that literature in a certain field or technology area suggests that further research is needed. This may be as simple as searching journal articles for language such as "more research is needed" or similar language. Or in other embodiments, natural language searching algorithms may carefully identify more complex language structures and research patterns which may indicate that additional research is needed. Further still, the system may analyze multiple journal articles to compile a list of research needs, and cross reference to identify overlap or repeated instances of research need in a particular issue. Such issues having widely accepted research need may be flagged automatically by the system, and may be weighted to give higher priority to such research opportunities. The system of the present invention will have access to a wide variety of journals and research databases. The searching is performed across these databases to identify and generate research needs for storage in a single location (the memory of the computer system) from a plurality of different journals and research databases.

The present invention solves a number of problems in multiple arts. For example, as noted throughout, there is a problem in the field of research that while many are able to do preliminary and high level research, there remains a great need for those to do the "leg work" and hard labor of various testing and other research methods to confirm, deny, or expound on existing research. The present invention solves this problem by connecting able researchers (students) with the research need as identified by the system from the literature review. Further, there is a problem in the educational field that students do not get enough real-world exposure and guided big picture experience. By being exposed to cutting edge research, and carrying out supporting research and other lab work, students see real world training in action, and are led to see the bigger picture issues through their own literature review. Further still, the present system improves the computer arts as well. In the prior art, one had to visit many websites, review many journals and/or research tools to perform a thorough review on a particular subject. This leads to a user navigating away or otherwise leaving the journal or research tool for another tool. The present invention scans many different of these journals and research tools/databases/corpus bodies and compiles the state of a particular field in a single user interface. As such, the user need not navigate away from the user interface of the present inventive system, ensuring retained user engagement. This further benefits the journals/databases etc. by allowing their users, via the present system, to get a full view of their content, rather than having a user navigate (as in a web browser) away from their articles.

Similarly, on the student and instructor/teacher/advisor side, the computerized system may automatically search keywords and natural language in a user's stored data profile. Another way of identification of the proper students and instructors may include ranking the complexity of the identified research using known grade level expertise, field of study data, traditional complexity of research at expected grade level, and the like Upon identifying potential candidates for the research, based on this data searching, the system may identify the potential research to the potential candidates through a notification system. In one embodiment, the research needs may be generated in a package presentation automatically by the computerized system.

This system provides a positive result to the students by providing them with all of the different $A_x$ trainings, as well as for researchers to utilize the students to perform research, present, and so forth. Certain embodiments may include a computer interface allowing system administrators to input research hypotheses, data sets, and the like, to provide estimates of work needed. Other or the same administrator(s) may then use the system to inquire of the estimated A, n, and x parameters for the teaching method to receive the information needed for the research and for optimal teaching arrangements. In further embodiments, feedback may be input into an interface of the computerized system and may impact later analysis for estimates of the A, n, and x values.

For example, if an estimated A value is too high but n value is too low, an administrator may provide this input to the computerized system, which in turn may factor this feedback into future analysis and optimization of the output variables by the computerized system.

Figure 2:
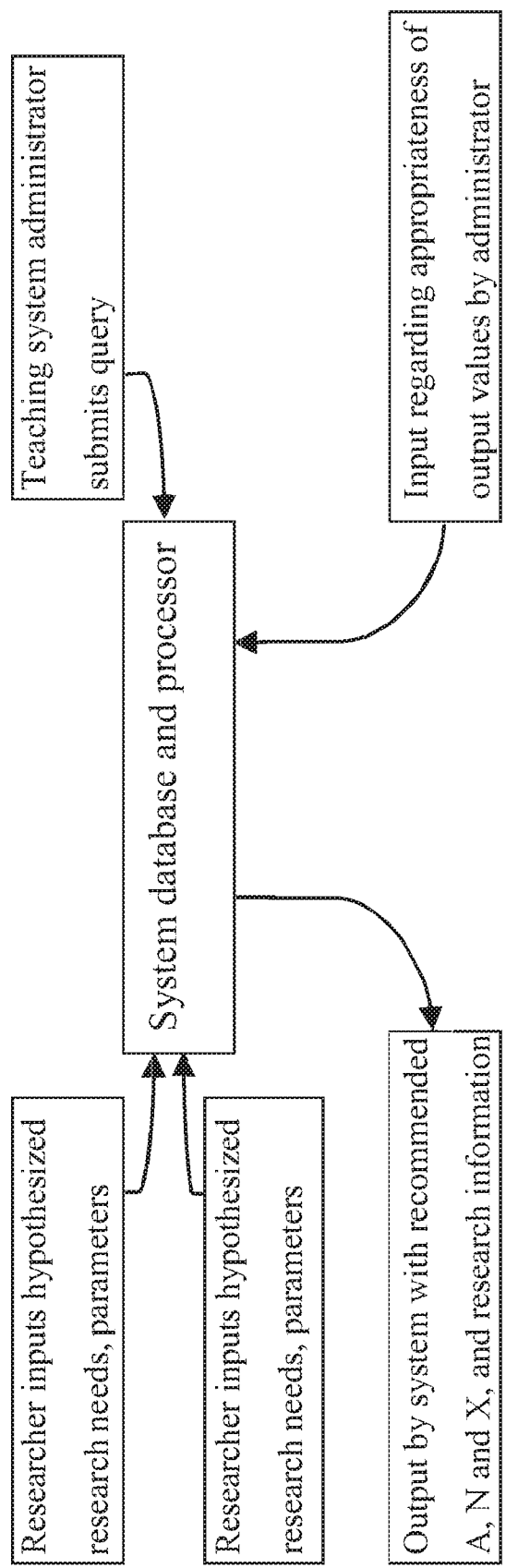
FIG. 2 provides a schematic of an embodiment of the computerized optimization system of the present invention for identifying research areas requiring additional work, estimating the required needs for the research, and providing an output to set up variables of the teaching system.
Figure 3:
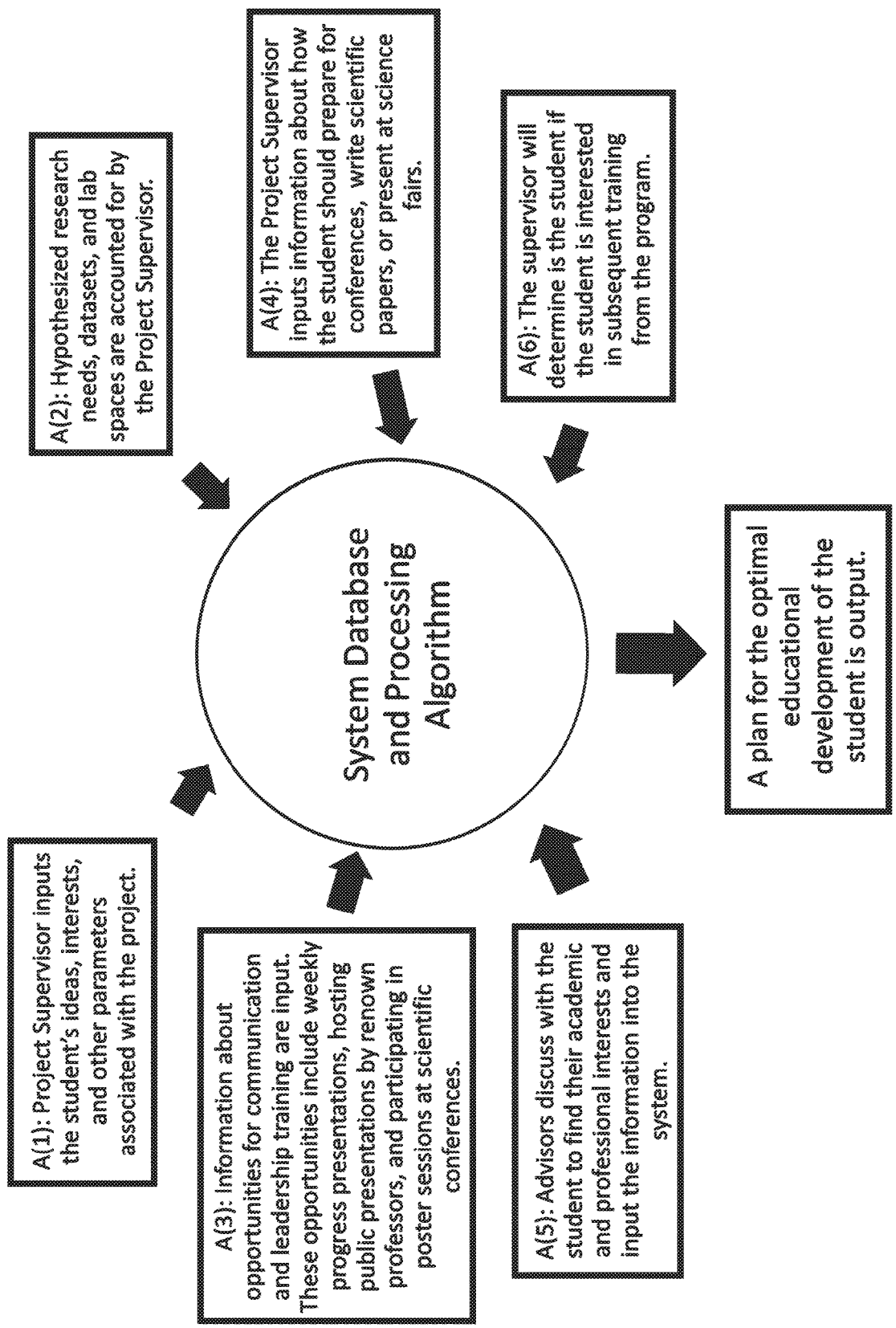
FIG. 3 provides a flow chart of another embodiment of the present teaching system.

Turning to FIGS. 1 and 3, a view of one embodiment of the present invention as a teaching method is provided. As noted, the educational teaching method is intended to train one person or a small group of students. The methodology is formulated as $(A^n)_x$-to-One model and its actions can be in the format of, for example: $[(A^2)_1, (A^3)_2, (A^1)_3, (A^1)_4, (A^0)_0, (A^0)_0]$, or A1-to-one, or A6-to-one, or A4-to-one. The number of advisors being the 'n' variable; the 'x' being the project numbers designed for the student or group thereof; the 'A' being different types of trainings or steps of the method; and the "to-one" being to one student or a small group of students. In the embodiment shown, the teaching method has an 'A' of 6, such that there are six training steps to this particular embodiment. The first step, A1 involves developing an innovative project. This innovative project may come from an outside source, such as external research needs, as discussed in detail below with respect to FIG. 2, thereby allowing the student(s) to perform real-world research and training work to aid in the advancement of academic research and development in technology areas where there is a need for it. Even in embodiments where the innovative project may come from an outside source, in many cases additional project design and development is needed, and the students may be trained on this step as well.

The second step in this embodiment, A2, involves performing research in labs and/or developing solutions to the problems presented. The A3 step involves leadership training to supplement the technical training being received. The leadership training is an important feature to encourage to be able to lead and to build self-confidence on top of their training in the technical aspects. The A4 step includes follow-up support, as well as an end product output, such as a research data, a solution to a problem, conference presentation, research paper, science competition presentation, computer program or programming, combinations thereof, and the like. This step is the point where students generate an output of some sort and/or compile outputs if they have been generated in earlier steps. The A5 step includes training focusing on career selection, college counseling, and/or career development training. The A6 step includes a later training, which could be called a retraining, which calls for the students to return to a similar training program for additional development. In all of these steps, the 'n' variable determines the number of advisors, which is the same for each step. These advisors may be the same people throughout the process, or may be different depending on the training type. In one embodiment, different task types may include at least one of a research design task, a project development task, a lab research task, a leadership training task, a follow-up support task, and a career development task.

FIG. 2 provides a schematic of an embodiment of the computerized optimization system of the present invention for identifying research areas requiring additional work, estimating the required needs for the research, and providing an output to set up variables of the teaching system. This system solves the problem of needing more research work in the educational and research fields as academics develop hypotheses to test and develop these hypotheses and initial research ideas. The problem is solved by utilizing the manpower of who happen to be being trained by the disclosed teaching method. This creates a mutually beneficial inventive system where the students are given important teaching and training, and through this teaching and training, are generating additional research, problem solving, and so forth, which is directly related to and supports the research needs of the researchers. For example, if a researcher has a hypothesis that a certain chemical may be useful as a catalyst in a particular reaction, some of the particular training of the teaching method ('A' variables) may be specifically tailored to test this hypothesis, generate data, and provide a tangible report and/or presentation, and/or data output.

Exemplary variables may include a student number of one, a student number of less than ten, and an advisor number of two. Of course, it is understood that these variables may vary widely without straying from the scope of the invention. However, a student number of one may, in some case, be advantageous In operation, the system may utilize a computer which has at least a memory and a processor in communication with each other. The computer is operable to receive a researcher input, such as a hypothesis, research needs, and/or preliminary data. In the embodiment of FIG. 2, more than one researcher may provide these inputs, thereby providing a plurality of options for the computerized system. Once received, the processor is operable to analyze the received research need information and calculate a plurality of teaching method variables, such as those noted above with respect to FIG. 1, for example. In a further embodiment, the computer may factor additional inputs into the teaching method variables calculations. For example, a system administrator may provide inputs that a student or students have disabilities or special education needs, such as listening ability, visual impairment information, logical thinking impairments, language barrier issues, and the like. This may lead, in some instances and depending on the research need, an increase or decrease in the calculated variables. In some cases, for example, an additional instructor may be added for a special needs student. The computer may further select from research needs which may fit well with a student's disabilities.

Upon a submission of a query, such as by a teaching system administrator, the system may provide an output back to the user who submitted the query with the recommended calculated plurality of teaching method variables, as well as information regarding the researcher inputs. This may be provided, for example, on a computerized display in communication with the processor, though any other presentation methods may be used as well. Similarly, the computerized display may present a search interface, allowing a user to provide input to the search interface to specify details relating to the desired research need to apply to the teaching method. With this, the teaching system administrator can apply the teaching method, such as that noted above with respect to FIG. 1 applied to the research need, thereby solving both problems of students needing dynamic teaching methods which cover both STEM teaching and leadership training, while at the same time generating real-world results usable by researchers to solve real problems and test hypotheses.

In this embodiment, the teaching system administrator or other use of the system, including a student may, after completion of the training, provide a result output from the teaching method, which can be relayed to the researcher and will be in the form of a document and/or data which provides some meaningful advancement in the research. Examples of result outputs from the teaching method may include, but are not limited to: a research report, research data, a scientific article, a science competition presentation, and a conference presentation. A feedback input may also be provided regarding the appropriateness of the output values by the teaching system administrator. The computerized system may store this feedback in the memory and may factor in this feedback input when calculating future calculated variables.

Turning to FIG. 3, a series of steps are shown in this embodiment of the process. A(1): Different Scientific Topics can be assigned with values by the system automatically. Machine Learning, which is a popular subject in the program, can be assigned the value of 3-M. "3" would stand for the field of Computer Science and "M" for machine learning. Other numerical values can be placed on a scale of 1-20 such as the estimated length and impact of the project.

A(2): Inputs may include cost of the materials and lab spaces needed to complete the project. Other parameters such as the size of the required dataset, number of datapoints needed, and time for collecting the data can be accounted for.

A(3): The supervisor can input stats about the number of weekly presentations the student is estimated to attend and their current level of presentation. Opportunities for presenting outside of the program will also be input.

A(4): This input is related to input 3 as it requires the supervisor to assess the student's current of level of presentation and scientific paper writing. The student may be rated on a scale of 1-20.

A(5): The advisors will input information obtained from their discussions with the student. This will include what they intend to study in college, and any possible careers. Although no numerical values can be assigned to the interests of a student, the information can be used as reference for the student's supervisors.

A(6): Sometimes research projects may require students to extend their knowledge and skillset far beyond their current abilities. In these cases, multiple training periods may be required to ensure that the student completes their project while maintaining a full understanding of the subject. The supervisor will input whether the student will be interested in further training, and it will factor into the intensity of the training.

The output of this embodiment will consist of what kind of training to do on certain days and the time that should be allotted to those sessions.

While several variations of the present invention have been illustrated by way of example in preferred or particular embodiments, it is apparent that further embodiments could be developed within the spirit and scope of the present invention, or the inventive concept thereof. However, it is to be expressly understood that such modifications and adaptations are within the spirit and scope of the present invention, and are inclusive, but not limited to the following appended claims as set forth.

Those skilled in the art will readily observe that numerous modifications, applications and alterations of the device and method may be made while retaining the teachings of the present invention.

What is claimed is:

1. A computerized system for connecting and applying research needs with a teaching method, the system comprising:
a computer having at least a memory and a processor in communication with each other, the computer operable to:
identify a research need in a field by using a keyword searching algorithm, wherein the keyword searching algorithm identifies the research need by identifying at least one piece of literature that suggests further research is needed;

receive an input from a researcher comprising the research need, the research need being stored in a memory along with a plurality of other research needs;

analyze the received research need input, including an included data provided with the research need;

calculate, based on the analyzed research need input, a plurality of teaching method variables comprising: an advisor number, a number of students, a number of tasks, and a number of a plurality of different task types;

wherein the computer processor is operable to receive a teaching method feedback input comprising an evaluation of the calculated plurality of teaching method variables, and storing the feedback input in the memory;

wherein the computer processor is further operable to generate an introductory email based on at least one of the stored research need or the stored teaching method feedback input, and the computer processor is further operable to send the introductory email to an identified individual;

wherein the teaching method variables are applied to a teaching method, wherein the advisor number determines the number of advisors for each of the number of tasks, the number of students determines the number of students for each of the number of tasks, and the number of the plurality of different task types determines the details of each of the number of tasks;

wherein the number of a plurality of different task types comprises at least one of a research design task, a project development task, a lab research task, a leadership training task, a follow-up support task, and a career development task; and providing an output with the calculated variables along with the received research need input, the output being useable by a teaching method administrator to apply the teaching method, thereby providing instructions to apply the teaching method for a particular research need;

receiving a result output from the teaching method, the result output being supplemental research information related to the research need;

providing the received result output to the researcher; and wherein the computer processor is further operable to calculate a second plurality of teaching method variables based on the stored feedback input.

2. The system of claim 1 wherein the number of a plurality of different task types comprises each of a research design task, a project development task, a lab research task, a leadership training task, a follow-up support task, and a career development task.

3. The system of claim 1 further comprising a computerized display in communication with the processor, and wherein the computer processor is further operable to present, on the computerized display, the output with the calculated variables.

4. The system of claim 3 wherein the display provides a visual representation of a search interface, allowing a user to provide an input to the search interface to cause the computer processor to provide an output of a plurality of variables relating to each of at least two of the plurality of research needs.

5. The system of claim 1 wherein the number of students is one.

6. The system of claim 1 wherein the number of students is less than ten.

7. The system of claim 1 wherein the number of advisors is two.

8. The system of claim 1 wherein the result output of the teaching methods comprises at least one of a research report, research data, a scientific article, a science competition presentation, and a conference presentation.

9. The system of claim 1 wherein the at least one of the plurality of different task types is a lab research task, and the computer processor is further operable to schedule and reserve a lab time slot.

* * * * *